(12) United States Patent
Benitez

(10) Patent No.: US 6,506,057 B1
(45) Date of Patent: Jan. 14, 2003

(54) METHOD FOR READING AND WRITING LINES CONTAINING WORDS FORMED FROM LETTERS

(76) Inventor: Emigdio R. Benitez, P.O. Box 539, David (PA)

( * ) Notice: Subject to any disclaimer, the term of this patent is extended or adjusted under 35 U.S.C. 154(b) by 111 days.

(21) Appl. No.: 09/662,622

(22) Filed: Sep. 15, 2000

(51) Int. Cl.7 .............................................. G09B 17/00
(52) U.S. Cl. ........................ 434/178; 434/156; 434/167
(58) Field of Search ................................ 434/156, 159, 434/162, 165, 167, 178, 184, 179; 283/45, 46, 62

(56) References Cited

U.S. PATENT DOCUMENTS

| | | | | |
|---|---|---|---|---|
| 2,723,465 A | * | 11/1955 | Silverstein | 434/178 |
| 3,672,074 A | * | 6/1972 | Huffstetter | 434/174 |
| 4,045,884 A | | 9/1977 | Zand | 35/35 R |
| 4,123,853 A | | 11/1978 | Dickensheet | 35/77 |
| 4,979,902 A | | 12/1990 | Morelle et al. | 434/184 |
| 5,336,093 A | * | 8/1994 | Cox | 434/178 |
| 5,584,698 A | | 12/1996 | Rowland | 434/184 |
| 6,113,147 A | * | 9/2000 | Johnson | 283/62 |
| 6,341,801 B1 | * | 1/2002 | Johnson | 283/62 |

FOREIGN PATENT DOCUMENTS

| | | | |
|---|---|---|---|
| CN | 1045731 | * | 10/1990 |

* cited by examiner

*Primary Examiner*—Jacob K. Ackun
*Assistant Examiner*—Kurt Fernstrom
(74) *Attorney, Agent, or Firm*—Richard L. Miller, P.A.

(57) ABSTRACT

An improved method for reading and writing lines containing words formed from letters. The method includes the steps of writing all odd numbered lines from left to right, writing all the words of the odd numbered lines from left to right, writing all the letters forming all the words of the odd numbered lines from left to right, positioning all the letters of each word of the odd numbered lines from left to right, writing all even numbered lines from right to left, writing all the words of the even numbered lines from right to left, writing all the letters forming all the words of the even numbered lines from left to right, positioning all the letters of each word of the even numbered lines from left to right, reading all the odd numbered lines from left to right, and reading all the even numbered lines from right to left.

2 Claims, 13 Drawing Sheets

This is an example to proceed with and reading of process new the writing. That maybe will be easier it to accustomed not people for.

FIG. 1

Once you get accustomed, it probably will be easier, at least. It was that way for Leonardo da Vinci.

FIG. 3

To keep the letters in the same position as usual but placing them in the way to read from right to left.

FIG. 5

METHOD FOR READING AND WRITING LINES CONTAINING WORDS FORMED FROM LETTERS

BACKGROUND OF THE INVENTION

1. Field of the Invention

The present invention relates to a method for reading and writing lines containing words formed from letters. More particularly, the present invention relates to an improved method for reading and writing lines containing words formed from letters.

2. Description of the Prior Art

Numerous innovations for dyslexics have been provided in the prior art that will be described. Even though these innovations may be suitable for the specific individual purposes to which they address, however, they differ from the present invention.

A FIRST EXAMPLE, U.S. Pat. No. 4,045,884 to Zand teaches for serious learning disabilities that are encountered by students learning to read, write and spell that include the mirror image reversal of letters, the writing of letters upside down, and letter reversals in words. Corrections of these disabilities is achieved by providing a correct or standard version of the letter or word symbol, a matching element with the correct version of the letter word symbol and indicia thereon which indicate proper orientation of the matching element for testing the match of the standard symbol with a series of test symbols aligned along a row, a majority of which are identical to the matching symbol on the matching element. The standard symbol and the test symbols that are used may be printed on a sheet or card and the matching symbol may be printed on a transparent overlay.

A SECOND EXAMPLE, U.S. Pat. No. 4,123,853 to Dickensheet teaches an educational device for dyslexic children which comprises a base, a shaft mounted on the base, a plurality of blocks mounted on the shaft for rotation relative to the base, and a mirror mounted on the base facing the shaft. Mirror-image and/or totally backwards indicia are carried by the blocks on at least one face of each of the blocks, whereby the blocks can be rotated to positions in which the indicia are reflected by the mirror.

A THIRD EXAMPLE, U.S. Pat. No. 4,979,902 to Morelle et al. teaches a method and apparatus for restricting field of vision so as to provide a dyslexic reader physical means for narrowing field-of-sight concentration in order to prevent eye wander and aid in normal compensatory sight narrowing by the reader. The method comprises an obfuscation of the peripheral field of vision while concurrently focusing or providing clear viewing means in the centralized, enhanced narrow reading field. The aforesaid method is readily accomplished by use of either the pin-hole camera, consisting of a minute aperture in an eye-enveloping, obfuscating field or, more practically, a set of spectacles consisting essentially of opacified or defocusing lenses having with them a centralized clear field-of-vision lens, window or aperture which effectively accomplishes in both eyes of the dyslexic reader what the pin-hole aperture does for a single eye.

A FOURTH EXAMPLE, U.S. Pat. No. 5,584,698 to Rowland teaches a teaching aid for increasing the reading efficiency of a dyslexic. The teaching aid comprises a transparent sheet of material having a plurality of horizontal color gradient that is placed over an area of text to be read. Preferably, each color gradient covers a single line of text. When the color gradient covert the text area, a less distracting environment is created and allows the dyslexic reader to more readily focus and concentrate on the line of text.

It is apparent that numerous innovations for dyslexics have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide an improved method for reading and writing lines containing words formed from letters that avoids the disadvantages of the prior art.

ANOTHER OBJECT of the present invention is to provide an improved method for reading and writing lines containing words formed from letters that is simple and inexpensive to manufacture.

STILL ANOTHER OBJECT of the present invention is to provide an improved method for reading and writing lines containing words formed from letters that is simple to use.

BRIEFLY STATED, YET ANOTHER OBJECT of the present invention is to provide an improved method for reading and writing lines containing words formed from letters. The method includes the steps of writing all odd numbered lines from left to right, writing all the words of the odd numbered lines from left to right, writing all the letters forming all the words of the odd numbered lines from left to right, positioning all the letters of each word of the odd numbered lines from left to right, writing all even numbered lines from right to left, writing all the words of the even numbered lines from right to left, writing all the letters forming all the words of the even numbered, lines from left to right, positioning all the letters of each word of the even numbered lines from left to right, reading all the odd numbered lines from left to right, and reading all the even numbered lines from right to left.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

DESCRIPTION OF THE DRAWING

The figures of the drawing are briefly described as follows:

FIG. 1 is an example created by the first embodiment of the present invention;

FIG. 3 is an example created by the second embodiment of the present invention;

FIG. 5 is an example created by the third embodiment of the present invention.

LIST OF REFERENCE NUMERALS UTILIZED IN THE DRAWING

Figure 2A:
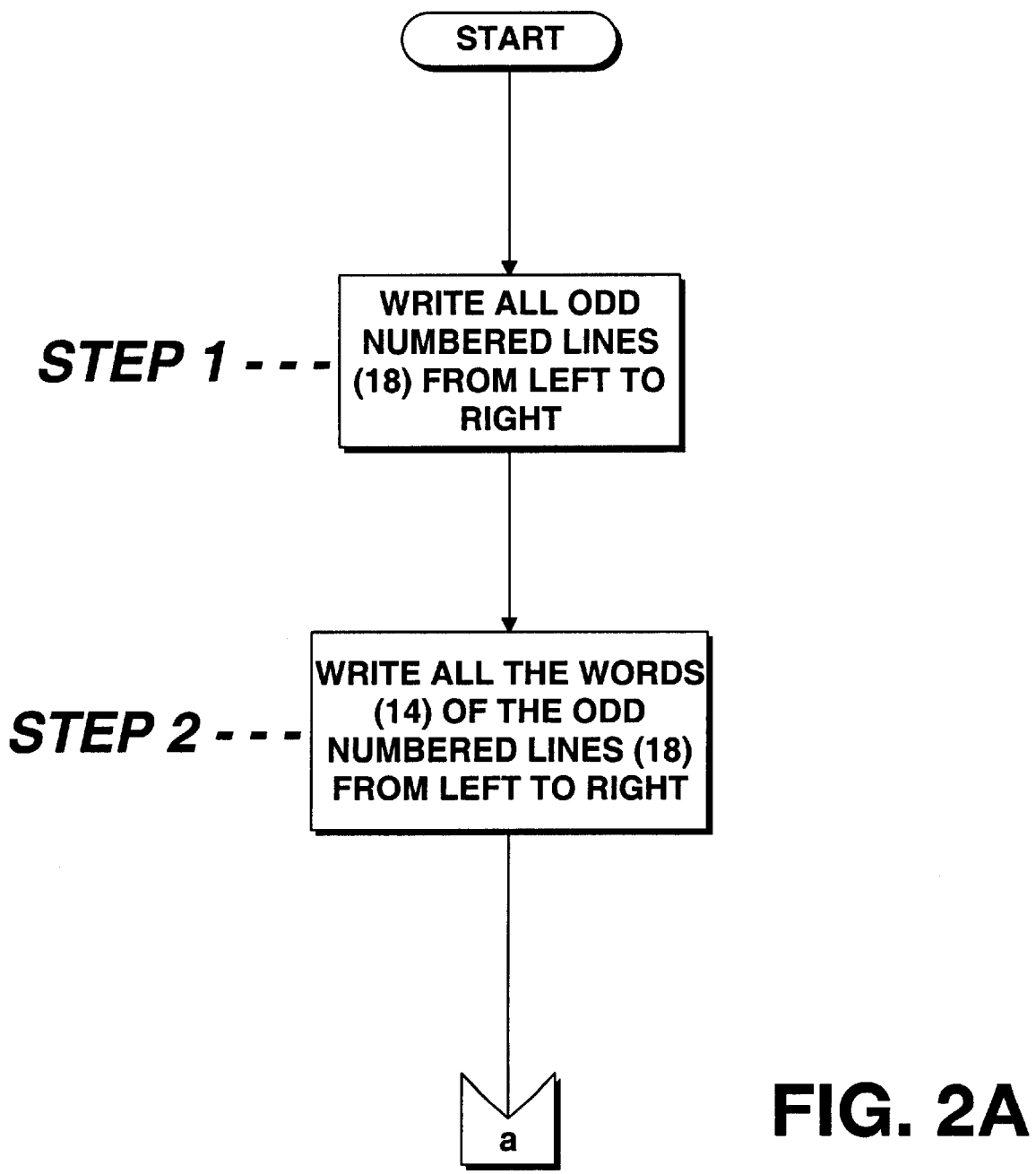
FIGS. 2A–2D is a flow chart of the first embodiment of the present invention.

First Embodiment 10 improved method of present invention for reading and writing lines 12 containing words 14 formed from letters 16

12 lines
14 words contained in lines 12
16 letters forming words 14 contained in lines 12
18 odd numbered lines of lines 12
20 even numbered lines of lines 12

Second Embodiment 110 improved method of present invention for reading and writing lines 112 containing words 114 formed from letters 116
112 lines
114 words contained in lines 112
116 letters forming words 114 contained in lines 112
118 odd numbered lines of lines 112
120 even numbered lines of lines 112

Third Embodiment 210 improved method of present invention for reading and writing lines 212 containing words 214 formed from letters 216
212 lines
214 words contained in lines 212
216 letters forming words 214 contained in lines 212
218 odd numbered lines of lines 212
220 even numbered lines of lines 212

DESCRIPTION OF THE PREFERRED EMBODIMENT

Figure 2B:
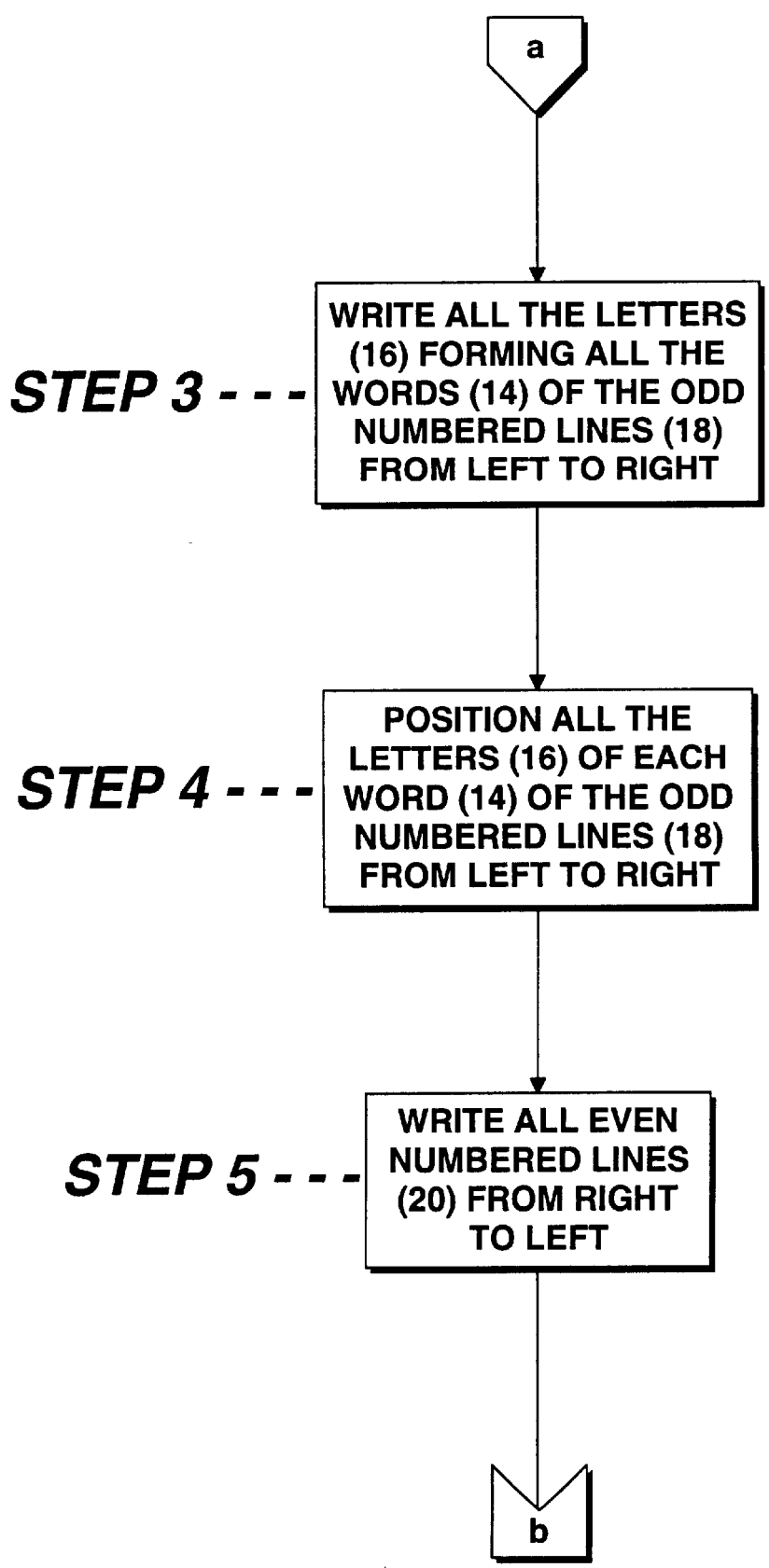
Figure 2C:
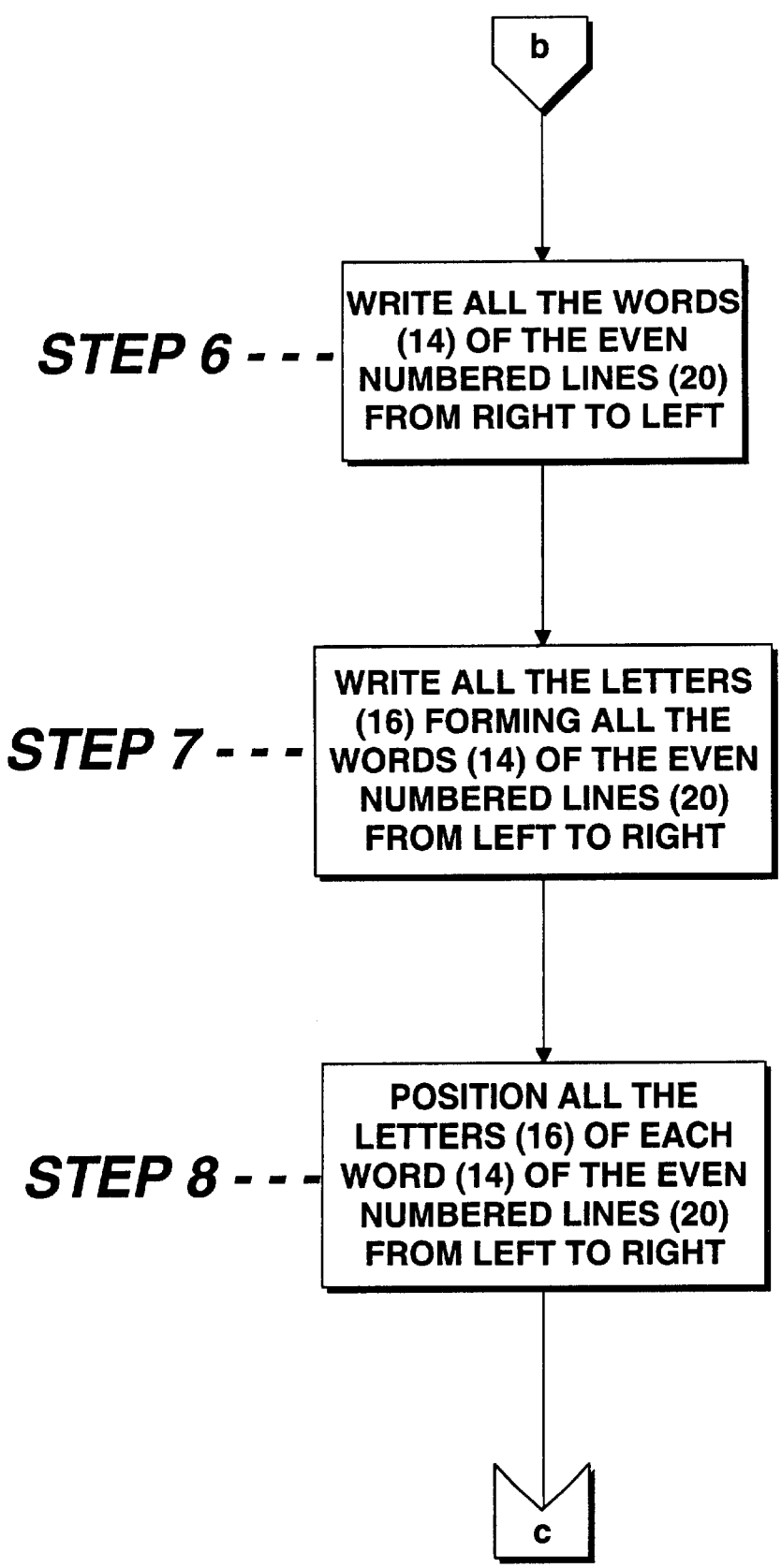
Figure 2D:
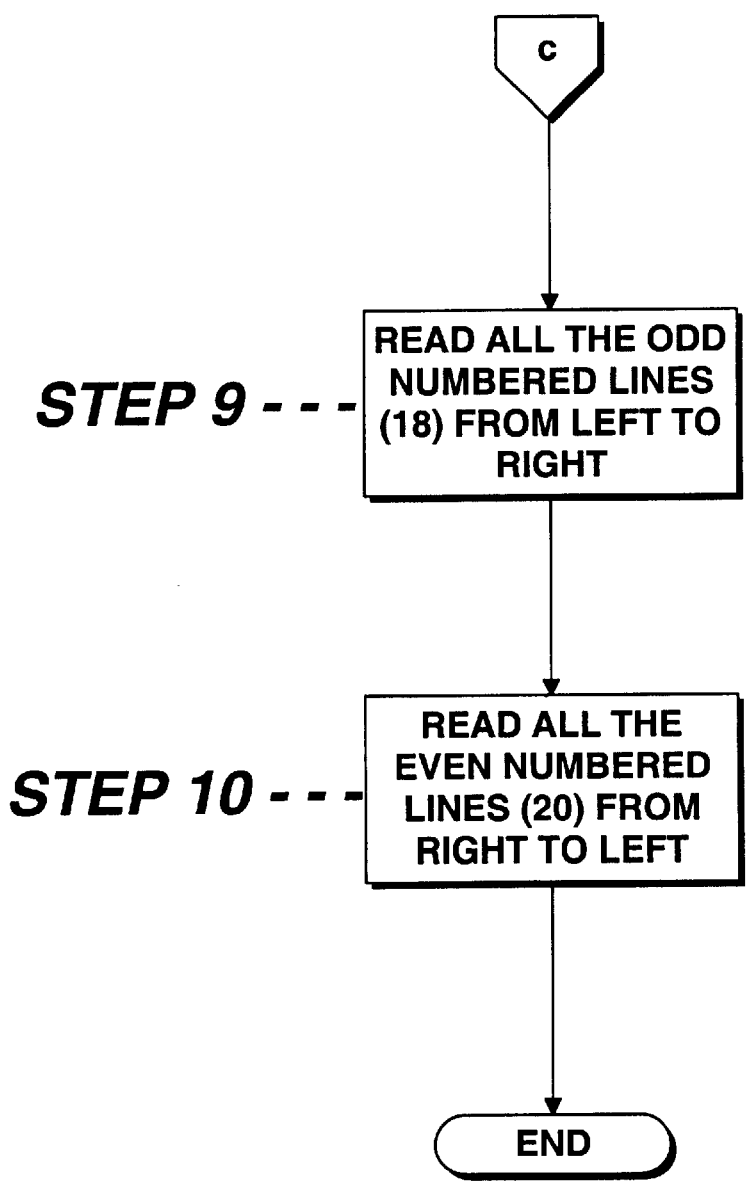

Referring now to the figures, in which like numerals indicate like parts, and particularly to FIGS. 1 and 2A–2D, the first embodiment of the improved method of the present invention is shown generally at 10 for reading and writing lines 12 containing words 14 formed from letters 16.

The improved method 10 includes the steps of:

STEP 1: Writing all odd numbered lines 18 from left to right.

STEP 2: Writing all the words 14 of the odd numbered lines 18 from left to right.

STEP 3: Writing all the letters 16 forming all the words 14 of the odd numbered lines 18 from left to right.

STEP 4: Positioning all the letters 16 of each word 14 of the odd numbered lines 18 from left to right.

STEP 5: Writing all even numbered lines 20 from right to left.

STEP 6: Writing all the words 14 of the even numbered lines 20 from right to left.

STEP 7: Writing all the letters 16 forming all the words 14 of the even numbered lines 20 from left to right.

STEP 8: Positioning all the letters 16 of each word 14 of the even numbered lines 20 from left to right.

STEP 9: Reading all the odd numbered lines 18 from left to right.

STEP 10: Reading all the even numbered lines 20 from right to left.

Figure 4A:
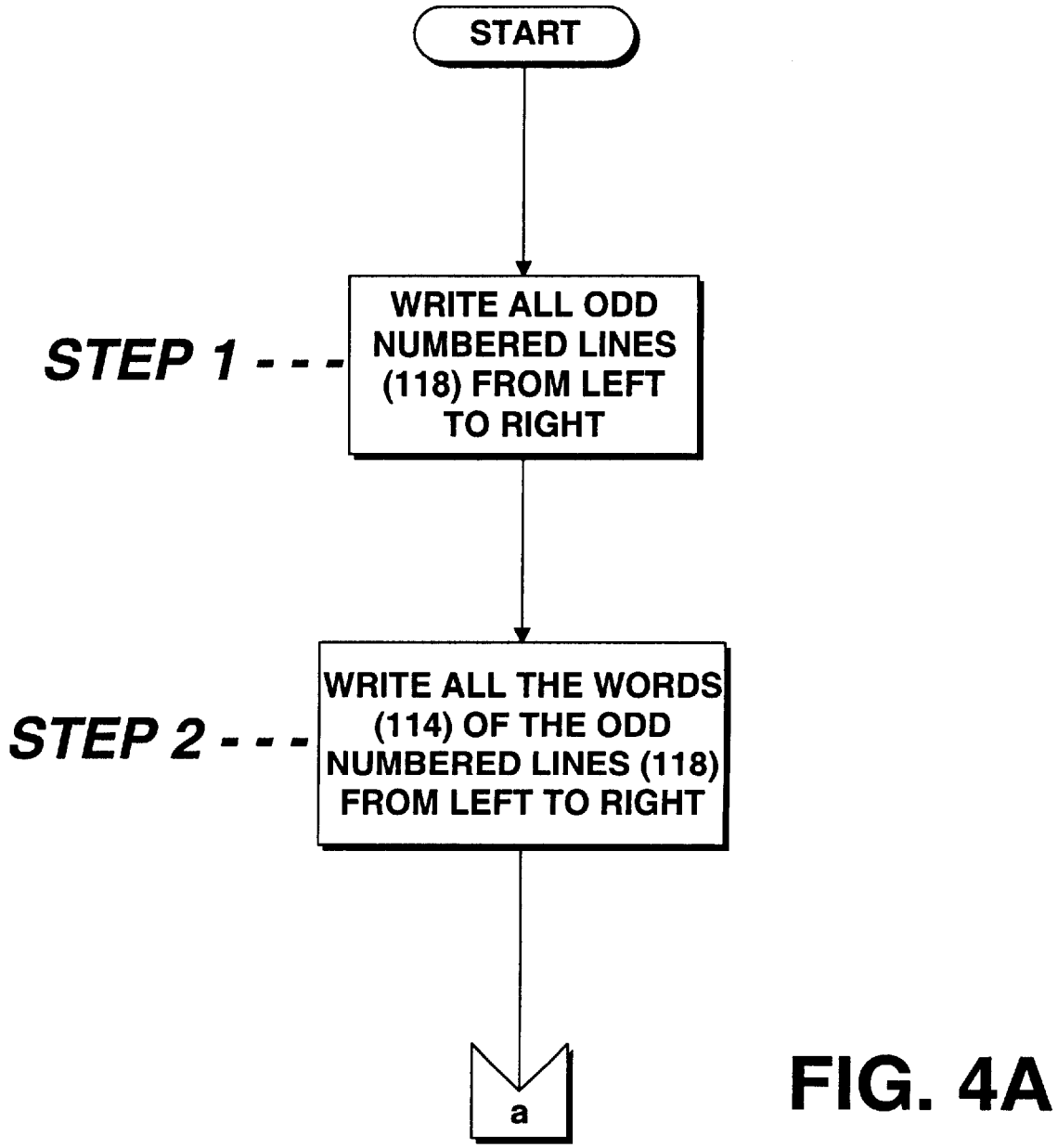
FIGS. 4A–4D is a flow chart of the second embodiment of the present invention.
Figure 4B:
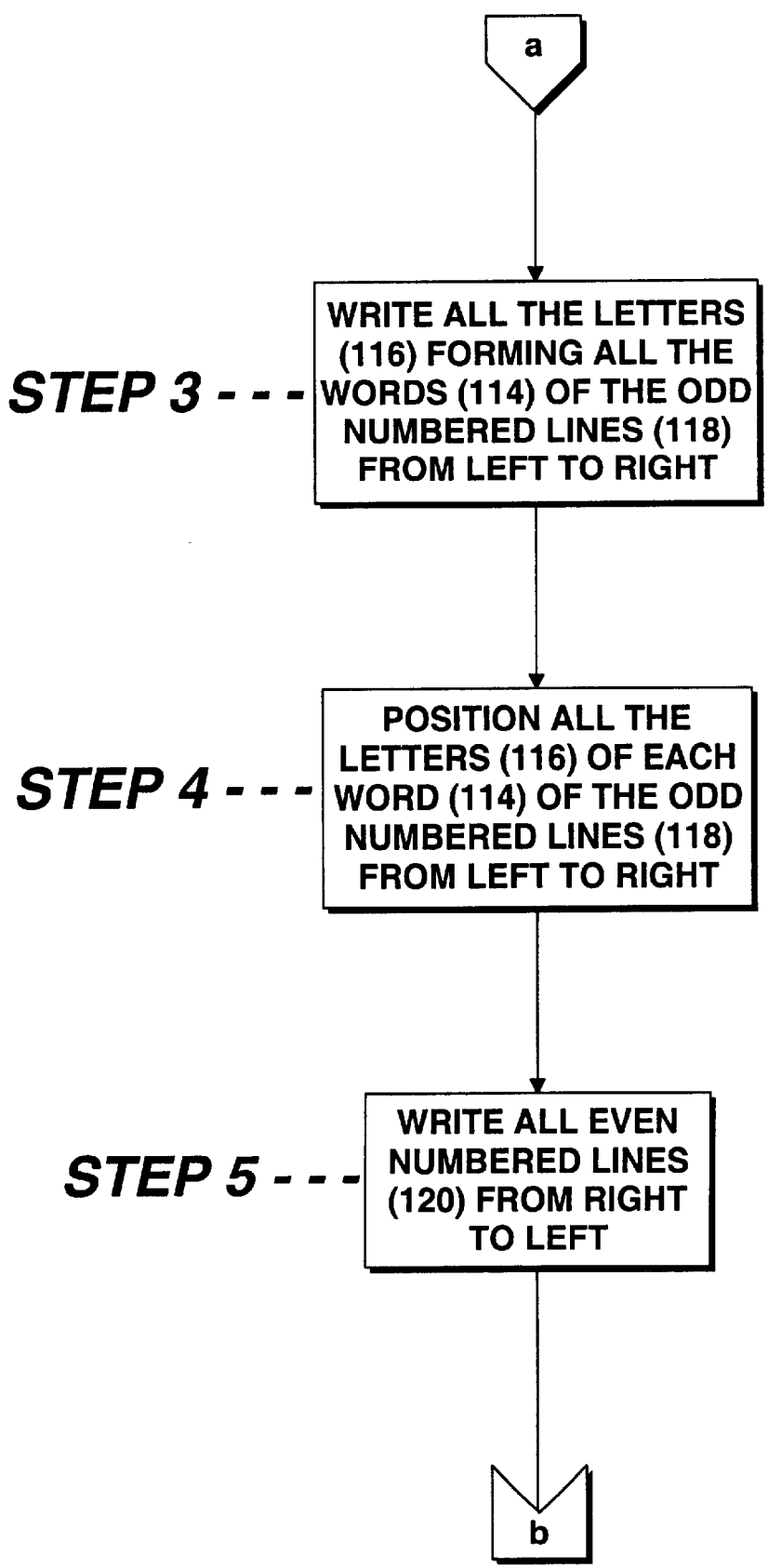
Figure 4C:
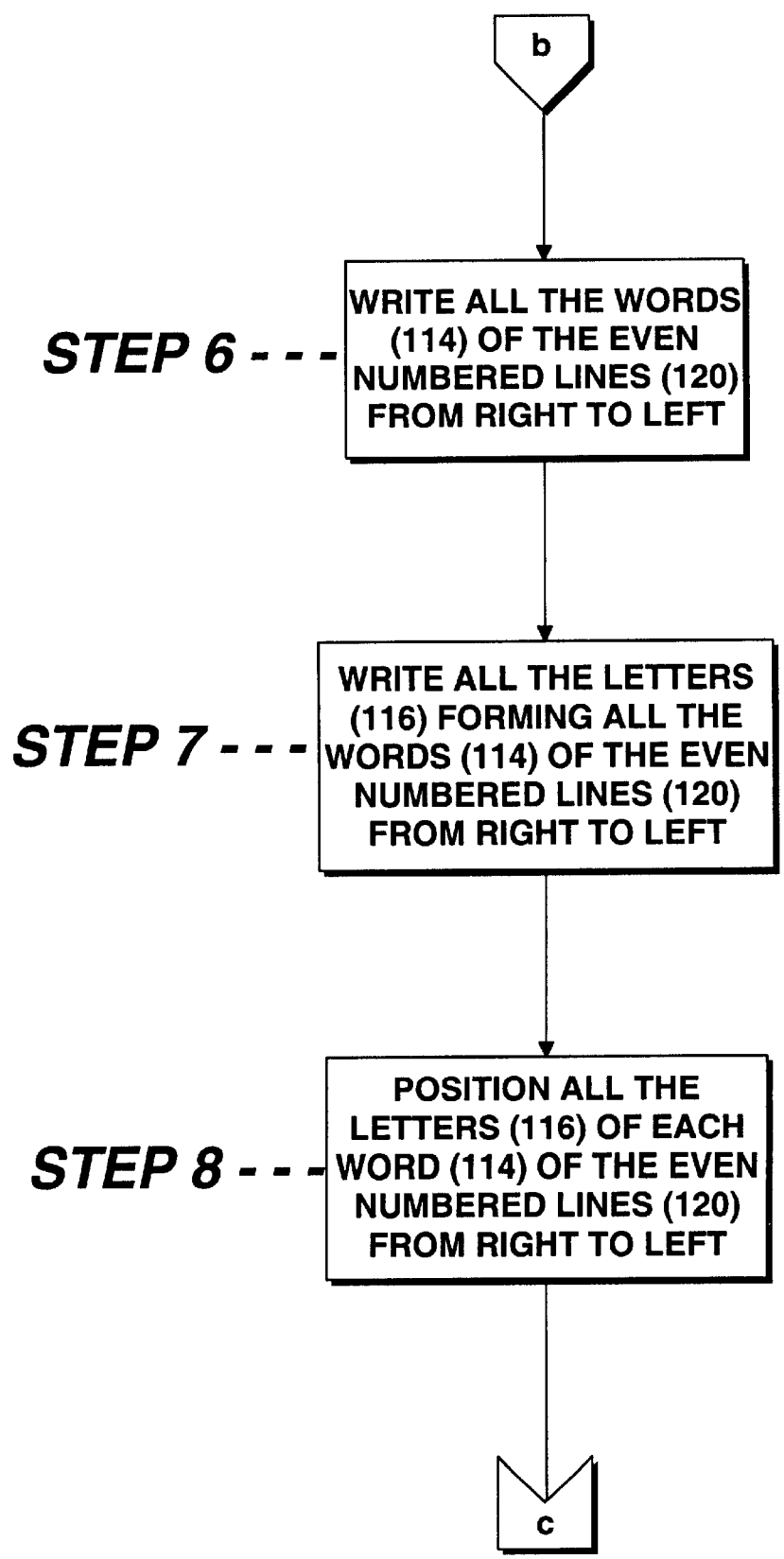
Figure 4D:
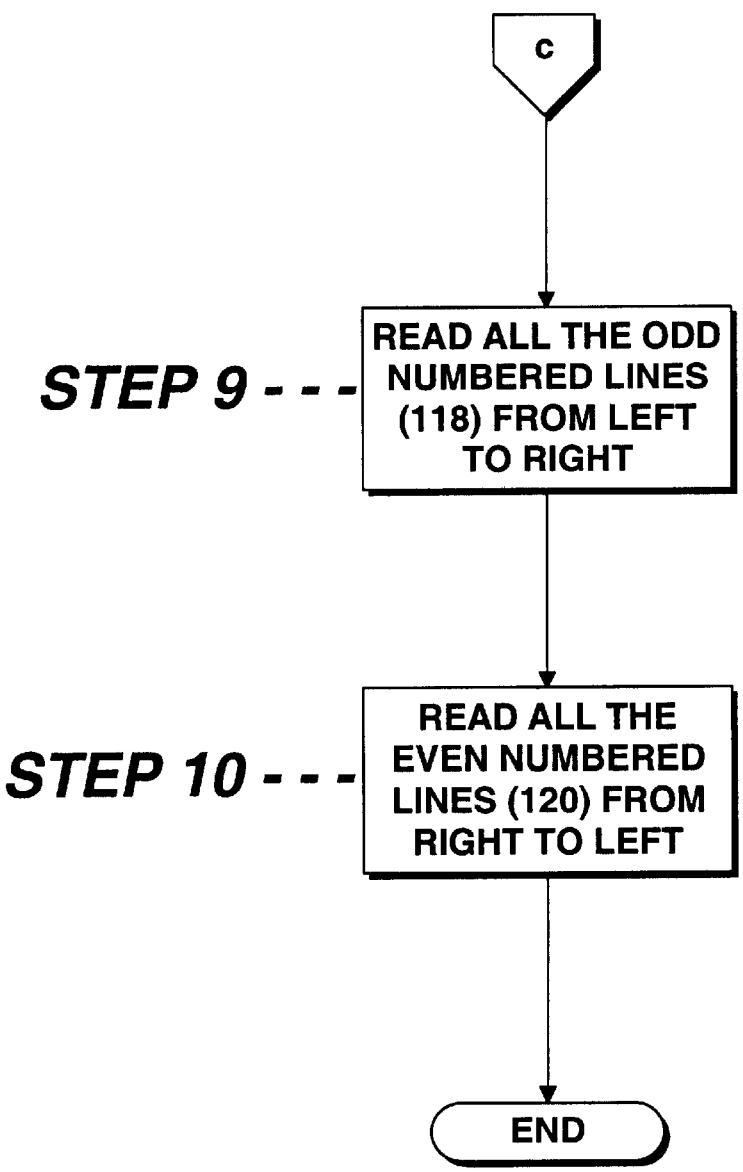

The second embodiment of the improved method 110 can best be seen in FIGS. 3 and 4A–4D, and as such, will be discussed with reference thereto.

The improved method 110 includes the steps of:

STEP 1: Writing all odd numbered lines 118 from left to right.

STEP 2: Writing all the words 114 of the odd numbered lines 118 from left to right.

STEP 3: Writing all the letters 116 forming all the words 114 of the odd numbered lines 118 from left to right.

STEP 4: Positioning all the letters 116 of each word 114 of the odd numbered lines 118 from left to right.

STEP 5: Writing all even numbered lines 120 from right to left.

STEP 6: Writing all the words 114 of the even numbered lines 120 from right to left.

STEP 7: Writing all the letters 116 forming all the words 114 of the even numbered lines 120 from right to left.

STEP 8: Positioning all the letters 116 of each word 114 of the even numbered lines 120 from right to left.

STEP 9: Reading all the odd numbered lines 118 from left to right.

STEP 10: Reading all the even numbered lines 120 from right to left.

Figure 6A:
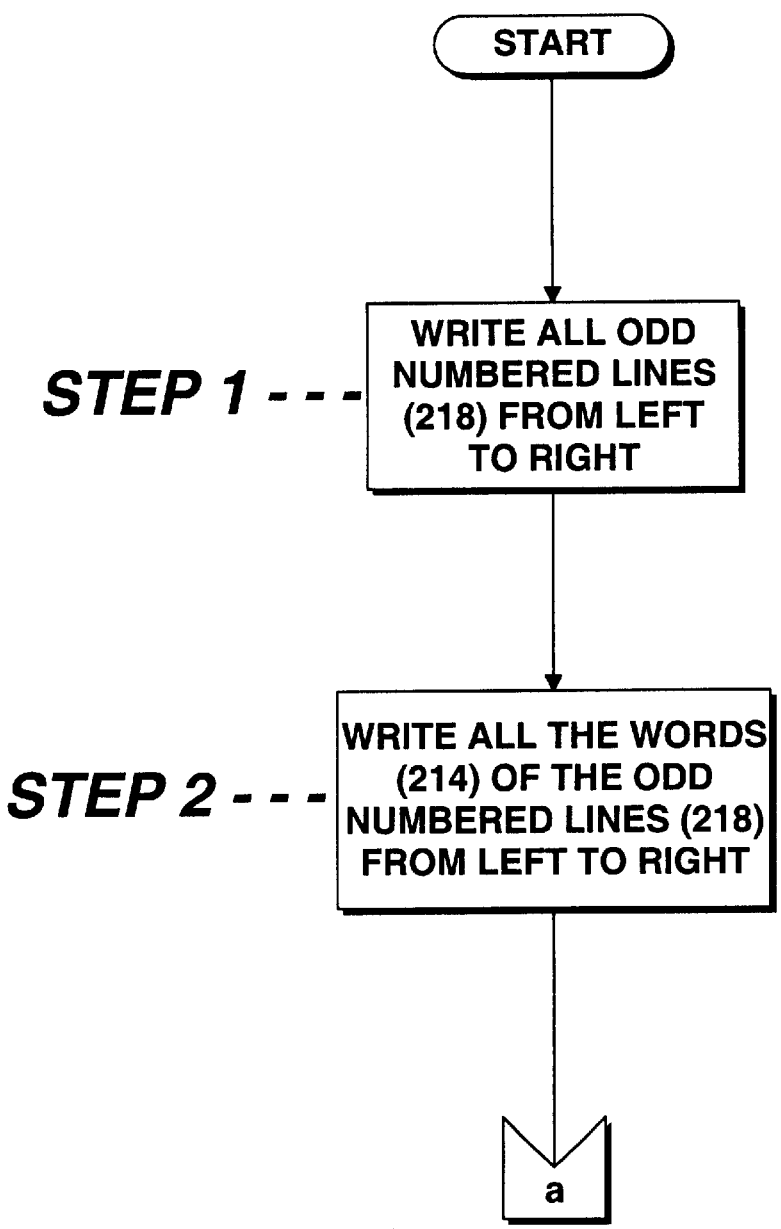
FIGS. 6A–6D is a flow chart of the third embodiment of the present invention.
Figure 6B:
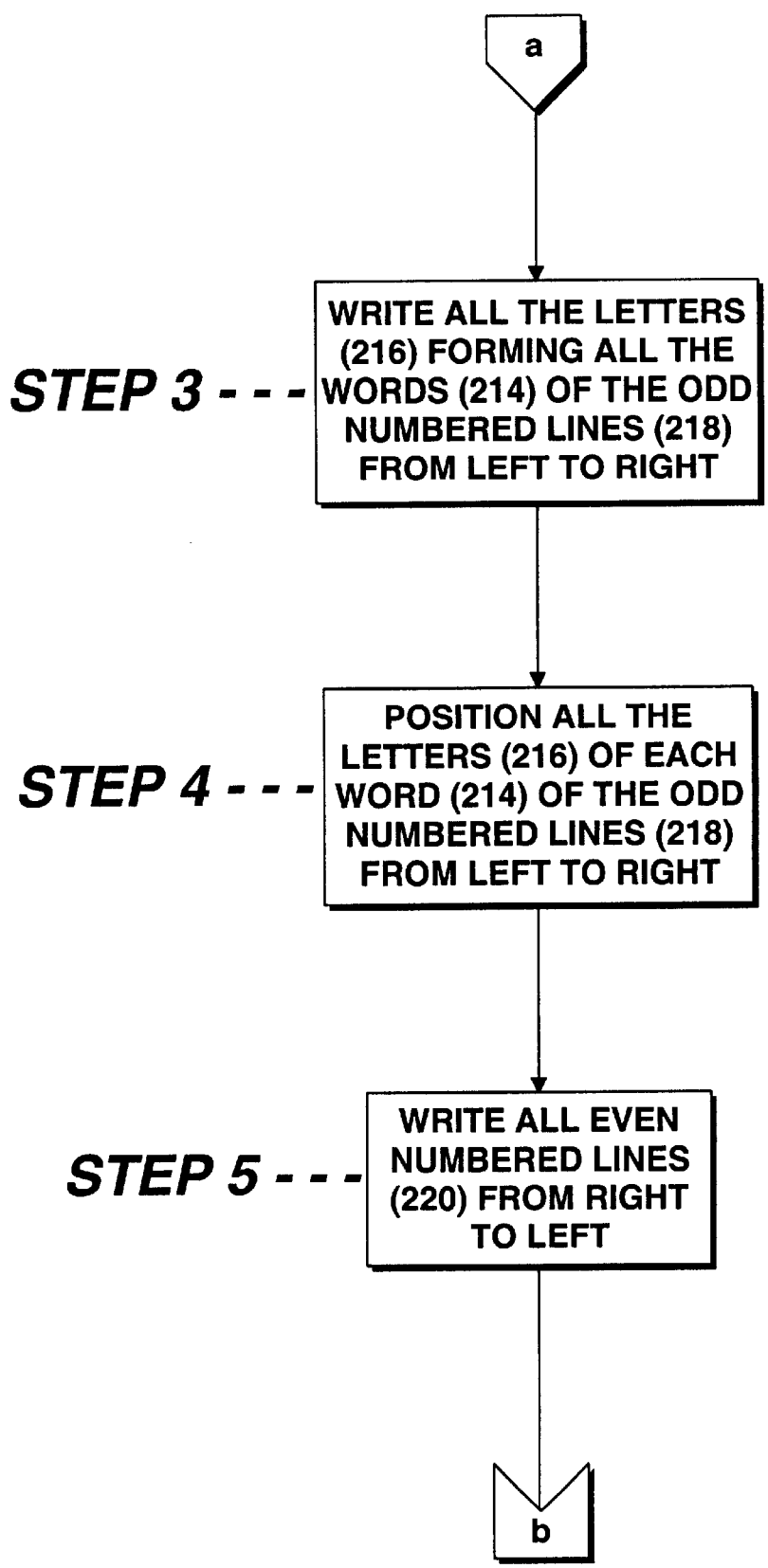
Figure 6C:
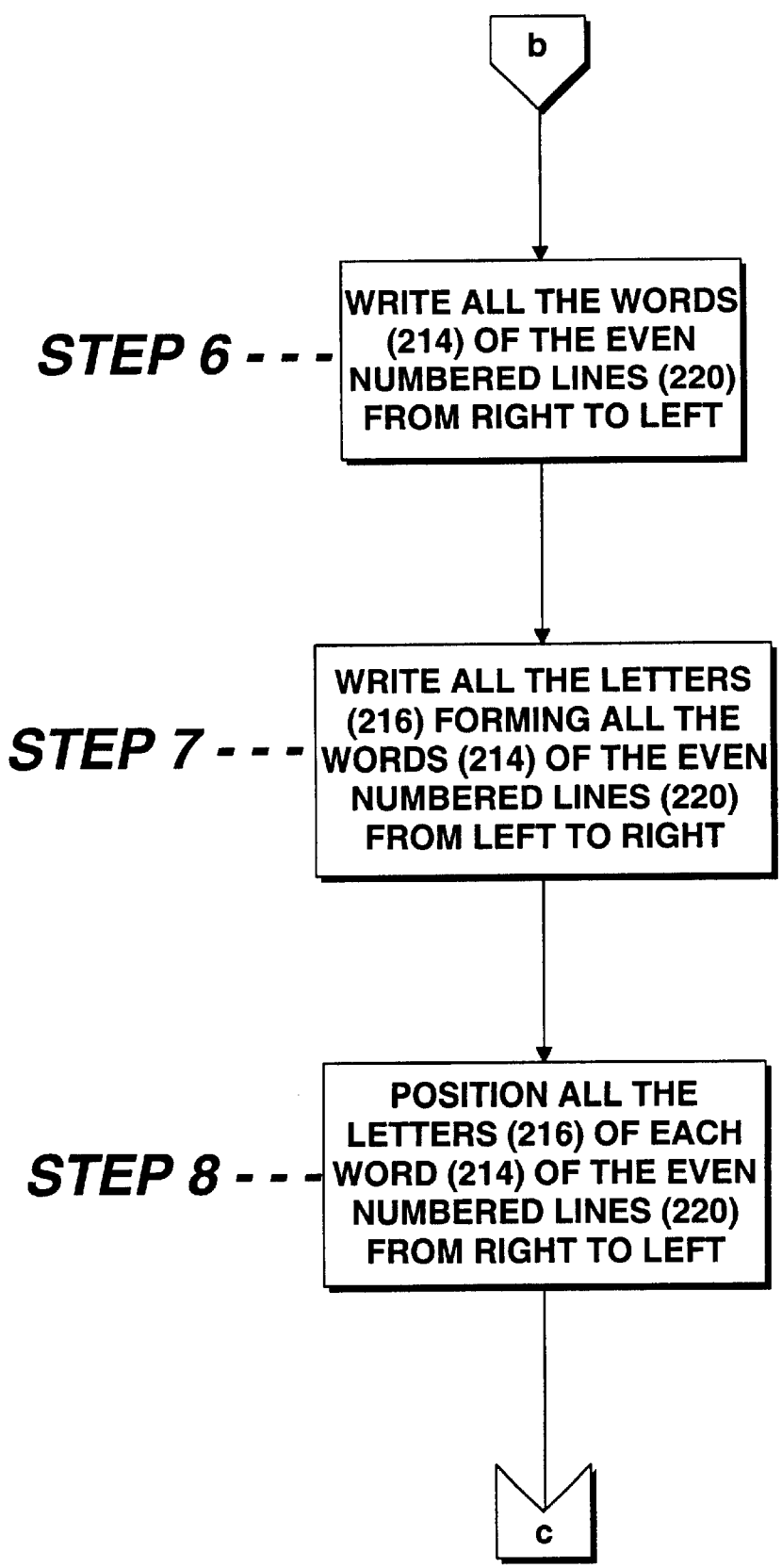
Figure 6D:
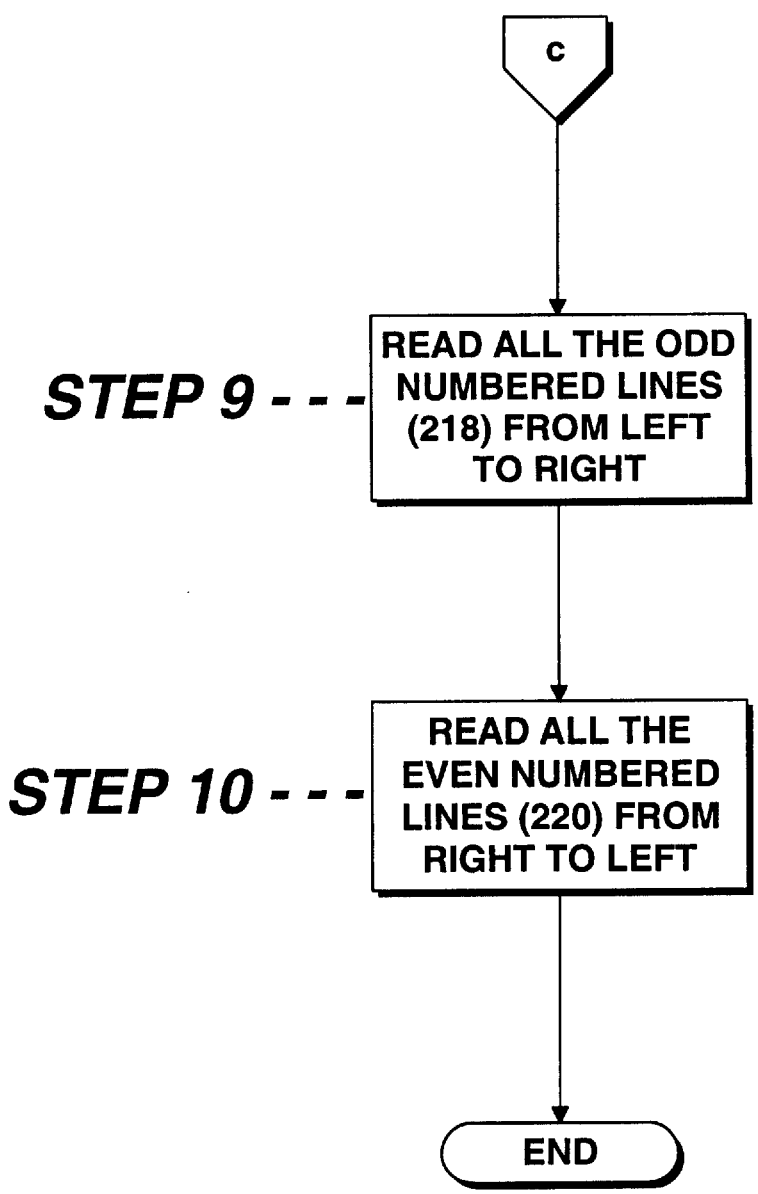

The third embodiment of the improved method 210 can best be seen in FIGS. 5 and 6A–6D, and as such, will be discussed with reference thereto.

The improved method 210 includes the steps of:

STEP 1: Writing all odd numbered lines 218 from left to right.

STEP 2: Writing all the words 214 of the odd numbered lines 218 from left to right.

STEP 3: Writing all the letters 216 forming all the words 214 of the odd numbered lines 218 from left to right.

STEP 4: Positioning all the letters 216 of each word 214 of the odd numbered lines 218 from left to right.

STEP 5: Writing all even numbered lines 220 from right to left.

STEP 6: Writing all the words 214 of the even numbered lines 220 from right to left.

STEP 7: Writing all the letters 216 forming all the words 214 of the even numbered lines 220 from left to right.

STEP 8: Positioning all the letters 216 of each word 214 of the even numbered lines 220 from right to left.

STEP 9: Reading all the odd numbered lines 218 from left to right.

STEP 10: Reading all the even numbered lines 220 from right to left.

It will be understood that each of the elements described above, or two or more together, may also find a useful application in other types of constructions differing from the types described above.

While the invention has been illustrated and described as embodied in an improved method for reading and writing lines containing words formed by letters, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, theforegoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An improved method for reading and writing lines containing words formed from letters, comprising the steps of:

a) writing all odd numbered lines from left to right;

b) writing all the words of the odd numbered lines from left to right;

c) writing all the letters forming all the words of the odd numbered lines from left to right;

d) positioning all the letters of each word of the odd numbered lines from left to right;

e) writing all even numbered lines from right to left;

f) writing all the words of the even numbered lines from right to left;

g) writing all the letters forming all the words of the even numbered lines from right to left;

h) positioning all the letters of each word of the even numbered lines from right to left;

i) reading all the odd numbered lines from left to right; and j) reading all the even numbered lines from right to left.

2. An improved method for reading and writing lines containing words formed from letters, comprising the steps of:

a) writing all odd numbered lines from left to right;

b) writing all the words of the odd numbered lines from left to right;

c) writing all the letters forming all the words of the odd numbered lines from left to right;

d) positioning all the letters of each word of the odd numbered lines from left to right;

e) writing all even numbered lines from right to left;

f) writing all the words of the even numbered lines from right to left;

g) writing all the letters forming all the words of the even numbered lines from left to right;

h) positioning all the letters of each word of the even numbered lines from right to left;

i) reading all the odd numbered lines from left to right; and j) reading all the even numbered lines from right to left.

\* \* \* \* \*